United States Patent
Shen et al.

(10) Patent No.: US 9,148,401 B2
(45) Date of Patent: Sep. 29, 2015

(54) METHOD FOR OBTAINING IP ADDRESS OF DHCPV6 SERVER, DHCPV6 SERVER, AND DHCPV6 COMMUNICATION SYSTEM

(75) Inventors: Shuo Shen, Shenzhen (CN); Sheng Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 519 days.

(21) Appl. No.: 13/316,076

(22) Filed: Dec. 9, 2011

(65) Prior Publication Data
US 2012/0084462 A1 Apr. 5, 2012

Related U.S. Application Data

(63) Continuation of application No. PCT/CN2010/073187, filed on May 25, 2010.

(30) Foreign Application Priority Data

Jun. 11, 2009 (CN) .......................... 2009 1 0107976

(51) Int. Cl.
G06F 15/16 (2006.01)
H04L 29/12 (2006.01)

(52) U.S. Cl.
CPC ...... *H04L 61/2015* (2013.01); *H04L 29/12915* (2013.01); *H04L 61/6013* (2013.01); *H04L 61/6059* (2013.01)

(58) Field of Classification Search
CPC ................................... H04L 61/2015
USPC .................. 709/245; 725/111; 370/400
See application file for complete search history.

(56) References Cited

U.S. PATENT DOCUMENTS

| 5,884,024 A | 3/1999 | Lim et al. |
| 2004/0205211 A1* | 10/2004 | Takeda et al. ............. 709/230 |
| 2006/0114898 A1 | 6/2006 | Gorteman et al. |
| 2007/0174473 A1 | 7/2007 | Zhao et al. |
| 2008/0025299 A1 | 1/2008 | Agarwal et al. |

(Continued)

FOREIGN PATENT DOCUMENTS

| CN | 1437360 A | 8/2003 |
| CN | 1458761 A | 11/2003 |

(Continued)

OTHER PUBLICATIONS

Extended European Search Report issued in corresponding European Patent Application No. 10785714.6, mailed Jan. 25, 2013.

(Continued)

*Primary Examiner* — Glenford Madamba
(74) *Attorney, Agent, or Firm* — Brinks Gilson & Lione

(57) ABSTRACT

The present invention relates to the field of communications, and in particular, relates to a method for obtaining an Internet Protocol (IP) address of a Dynamic Host Configuration Protocol version 6 (DHCPv6) server, a DHCPv6 server, and a DHCPv6 communication system. The method is applied in a scenario of communication through a DHCPv6 relay agent, and includes: receiving, by a DHCPv6 server, a message of a DHCPv6 client forwarded by a DHCPv6 relay agent; sending, by the DHCPv6 server, a response message to the DHCPv6 client through the DHCPv6 relay agent, in which a payload of the response message carries an IP address of the DHCPv6 server, so that the DHCPv6 client obtains the IP address of the DHCPv6 server from the response message.

15 Claims, 4 Drawing Sheets

(56) References Cited

U.S. PATENT DOCUMENTS

| 2009/0125957 A1* | 5/2009 | Singh et al. ............... 725/111 |
| 2009/0225761 A1* | 9/2009 | Sarikaya et al. ............ 370/400 |
| 2010/0083354 A1* | 4/2010 | Tsirtsis ........................ 726/5 |

FOREIGN PATENT DOCUMENTS

| CN | 1783890 A | 6/2006 |
| CN | 101039176 A | 9/2007 |
| CN | 101075944 A | 11/2007 |
| CN | 101075962 A | 11/2007 |
| EP | 2048858 A1 | 4/2009 |
| WO | WO 2008050061 A2 | 5/2008 |

OTHER PUBLICATIONS

Alexander et al., "DHCP Options and BOOTP Vendor Extensions" Network Working Group, Mar. 1997.
Droms et al., "DHCP for IPv6" RFC 3315, Jul. 2003.
Droms et al., "Dynamic Host Configuration Protocol for IPv6 (DHCPv6)" Network Working Group, Jul. 2003.
Popoviciu et al., "DHCPv6 Delegation of Certificates Option" Network Working Group, Feb. 25, 2008.
International Search Report and Written Opinion of the International Searching Authority issued in corresponding PCT Patent Application No. PCT/CN2010/073187, mailed Sep. 2, 2010.
Jiang et al., "Secure DHCPv6 Using CGAS" Network Working Group, Jan. 8, 2009.
Jiang et al., "Secure DHCPv6 Using CGAS" Network Working Group, Jul. 13, 2009.
Volz, "Dynamic Host Configuration Protocol for IPv6 (DHCPv6) Relay Agent Subscriber-ID Option" Network Working Group, Jun. 2006.
Volz, "Dynamic Host Configuration Protocol for IPv6 (DHCPv6) Relay Agent Subscriber-ID Option" Network Working Group, Aug. 2006.
Office Action issued in corresponding Japanese Patent Application No. 2012-514332, mailed Apr. 23, 2013.
Office Action issued in corresponding Chinese Patent Application No. 200910107976.8, mailed Jul. 8, 2013, 6 pages.
Office Action issued in corresponding Korean Patent Application No. 10-2011-7031586, mailed Jun. 13, 2013, 5 pages.
Office Action issued in corresponding Chinese Patent Application No. 200910107976.8, mailed Oct. 9, 2012.
Office Action issued in corresponding Korean Patent Application No. 10-2011-7031586, mailed Sep. 5, 2013, 5 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    OPTION_SERVERIP            |           option-len           |
+-+-+-+-+-+-+-+-+-+-+-+-+-+-+-+-+-+-+-+-+-+-+-+-+-+-+-+-+-+-+-+-+
.                                                                .
.                         Server IP Address                      .
.                                                                .
+-+-+-+-+-+-+-+-+-+-+-+-+-+-+-+-+-+-+-+-+-+-+-+-+-+-+-+-+-+-+-+-+
```

US 9,148,401 B2

METHOD FOR OBTAINING IP ADDRESS OF DHCPV6 SERVER, DHCPV6 SERVER, AND DHCPV6 COMMUNICATION SYSTEM

CROSS-REFERENCE TO RELATED APPLICATIONS

This application is a continuation of International Application No. PCT/CN2010/073187, filed on May 25, 2010, which claims priority to Chinese Patent Application No. 200910107976.8, filed on Jun. 11, 2009, both of which are hereby incorporated by reference in their entireties.

FIELD OF THE INVENTION

The present invention relates to the field of communications, and in particular to a method for obtaining an Internet Protocol (IP) address of a Dynamic Host configuration Protocol version 6 (DHCPv6) server, a DHCPv6 server, and a DHCPv6 communication system.

BACKGROUND OF THE INVENTION

In a broadband network, if a client sends a network access request, a server which is in the network and is responsible for IP address allocation allocates an IP address to the client sending the network access request, so that the client may access the network. At present, the servers involved in network access of the client in the broadband network are a DHCPv6 server and a DHCPv6 relay server using a standard DHCP protocol. When the client accesses the network, the client sends a DHCP request message to the DHCPv6 relay server, for applying for accessing the network; the DHCPv6 relay server receives and forwards the request message to the DHCPv6 server; after receiving the DHCP request message of the client, the DHCPv6 server records network initialization information including an IP address allocated to the client and its own IP address in a DHCP reply message, and sends the DHCP reply message to the DHCPv6 relay server; and the DHCPv6 relay server forwards the DHCP reply message received from the DHCPv6 server to the client, so that the client obtains the IP addresses, and accesses the network.

In the DHCPv6 protocol, when the client and the DHCPv6 server are not in the same link, a DHCPv6 relay configuration function and a message forwarding function can be implemented on a router, and a DHCPv6 relay agent can effectively solve the problem of address configuration, so as to enable the client to successfully apply for the IP address.

When the client sends the message to the DHCPv6 server, the IP address of the client is not lost in a relayed process; and when the DHCPv6 server returns a message to client, as the relay agent strips a message header of the message sent back from the DHCPv6 server in forwarding the message sent back from the DHCPv6 server, so that the IP address of the DHCPv6 server carried in the message header is discarded. Therefore, the client cannot know the IP address of the DHCPv6 server, so that the client cannot perform source address authentication on the message from the DHCPv6 server, and the client cannot effectively protect the message sent between the DHCPv6 server and the DHCPv6 client.

SUMMARY OF THE INVENTION

Embodiments of the present invention provide a method for obtaining an IP address of a DHCPv6 server, a DHCPv6 server, and a DHCPv6 communication system, so as to solve the problem that the IP address of the DHCPv6 server cannot be obtained in a DHCP v6 relay manner at present.

In order to solve the foregoing problem, an embodiment of the present invention provides a method for obtaining an IP address of a DHCPv6 server. The method is applied in a scenario of communication through a DHCPv6 relay agent, and includes: receiving, by a DHCPv6 server, a message of a DHCPv6 client forwarded by a DHCPv6 relay agent; sending, by the DHCPv6 server, a response message to the DHCPv6 client through the DHCPv6 relay agent, in which a payload of the response message carries an IP address of the DHCPv6 server, so that the DHCPv6 client obtains the IP address of the DHCPv6 server from the response message.

In order to solve the foregoing problem, an embodiment of the present invention provides a DHCPv6 server. The DHCPv6 server is applied in a scenario of communication through a DHCPv6 relay agent, and includes a receiving unit, configured to receive a message of a DHCPv6 client forwarded by a DHCPv6 relay agent; and a response unit, configured to send a response message to the DHCPv6 client through the DHCPv6 relay agent, in which a payload of the response message carries an IP address of the DHCPv6 server, so that the DHCPv6 client obtains the IP address of the DHCPv6 server from the response message.

In order to solve the foregoing problem, an embodiment of the present invention provides a DHCPv6 communication system, which includes a DHCv6 server, a DHCPv6 relay agent, and a DHCPv6 client. The DHCPv6 server is configured to receive a message of a DHCPv6 client forwarded by the DHCPv6 relay agent, and send a response message to the DHCPv6 client through the DHCPv6 relay agent, in which a payload of the response message carries an IP address of the DHCPv6 server, so that the DHCPv6 client obtains the IP address of the DHCPv6 server from the response message.

Optionally, the IP address of the DHCPv6 server is a Cryptographically Generated Address (CGA) of the DHCPv6 server.

In the method for obtaining the IP address of the DHCPv6 server, the DHCPv6 server, and the DHCPv6 communication system according to the embodiments of the present invention, the IP address of the DHCPv6 server is carried in the payload of the DHCPv6 message sent by the DHCPv6 server to the DHCPv6 client by extending the message, so that the DHCPv6 relay agent strips only the message header of the message sent by the DHCPv6 server, rather than the IP address of the DHCPv6 server carried in the payload of the message sent by the DHCPv6 server, when the DHCPv6 server communicates with the DHCPv6 client through the DHCPv6 relay agent, so that the DHCPv6 client can obtain the IP address of the DHCPv6 server from the message sent by the DHCPv6 server and forwarded by the DHCPv6 relay agent.

In addition, when the DHCPv6 server uses the CGA, the message sent between the DHCPv6 server and the DHCPv6 client can be effectively protected.

DETAILED DESCRIPTION OF THE EMBODIMENTS

Processes for implementing embodiments of the present invention are described below with reference to the accompanying drawings.

In an embodiment of the present invention, an IP address of a DHCPv6 server is carried in a payload of a DHCPv6 message sent by the DHCPv6 server to a DHCPv6 client by extending the message, so that a DHCPv6 relay agent strips only a message header of the message sent by the DHCPv6 server, rather than the IP address of the DHCPv6 server carried in the payload of the message sent by the DHCPv6 server, when the DHCPv6 server communicates with the DHCPv6 client through the DHCPv6 relay agent, so that the DHCPv6 client can obtain the IP address of the DHCPv6 server from the message sent by the DHCPv6 server and forwarded by the DHCPv6 relay agent.

For example, the DHCPv6 server receives a message of the DHCPv6 client forwarded by the DHCPv6 relay agent; and the DHCPv6 server sends a response message to the DHCPv6 client through the DHCPv6 relay agent, in which the payload of the response message carries the IP address of the DHCPv6 server, so that the DHCPv6 client obtains the IP address of the DHCPv6 server from the response message.

In the forgoing example, the message of the DHCPv6 client may be any one of the following: a solicit message, a request message, a renew message, a rebind message, an information-request message, a confirm message, a release message, and a decline message. The response message may be any one of the following: an advertise message, a reply message, a relay-reply message, and a reconfigure Message. Hereinafter, descriptions are made respectively.

In the DHCPv6 protocol, both the DHCPv6 client and the DHCPv6 server have a DHCP Unique Identifier (DUID). The DHCPv6 server identifies the DHCPv6 client sending the request according to the DUID of the DHCPv6 client, and the DHCPv6 client identifies the DHCPv6 server according to the DUID of the DHCPv6 server.

In an embodiment of the present invention, the IP address of the DHCPv6 server is carried in a DUID field by extending DUID types in some messages sent by the DHCPv6 server to the DHCPv6 client through the DHCPv6 relay agent, so that the message arrived at the DHCPv6 client through the DHCPv6 relay agent still carries the IP address of the DHCPv6 server, and therefore the DHCPv6 client can obtain the IP address of the DHCPv6 server, which is applied in a scenario of CGA.

Figure 1:
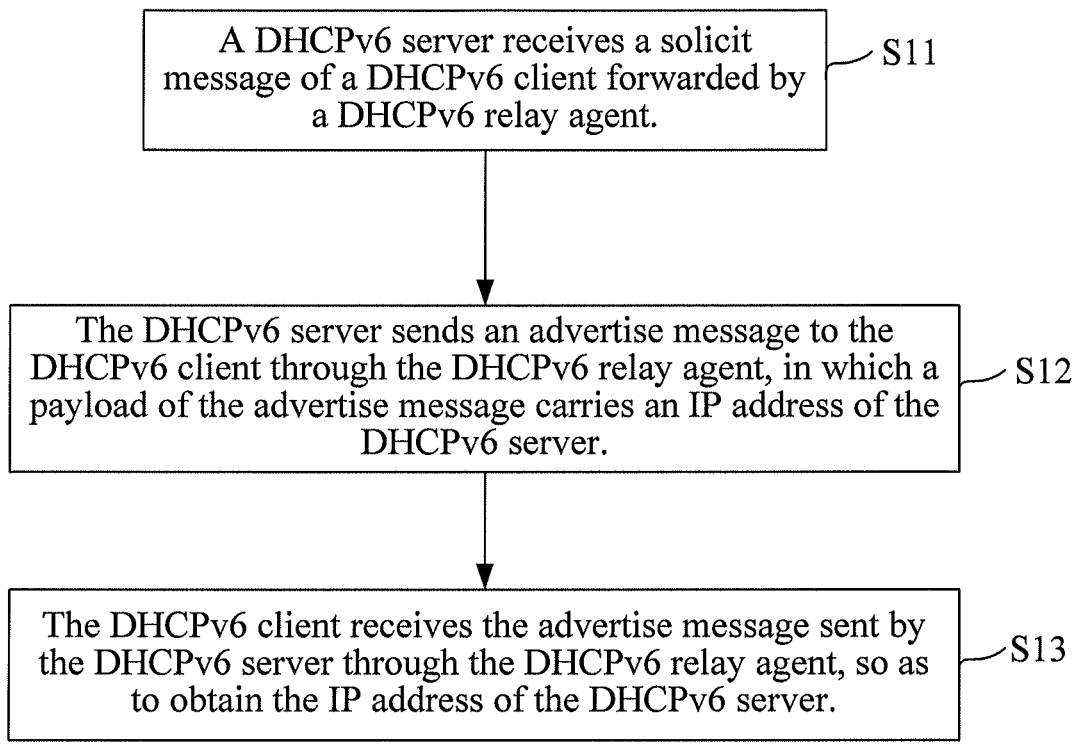
FIG. 1 is schematic flow chart of a method for obtaining an IP address of a DHCPv6 server according to Embodiment 1 of the present invention.

As shown in FIG. 1, a method for obtaining an IP address of a DHCPv6 server according to Embodiment 1 of the present invention includes the following steps.

In step S11, a DHCPv6 server receives a solicit message of a DHCPv6 client forwarded by a DHCPv6 relay agent, in which the solicit message is sent by the DHCPv6 client to the DHCPv6 relay agent for finding the DHCPv6 server.

Optionally, the solicit message may carry a client identifier option of the DHCPv6 client.

In step S12, the DHCPv6 server sends an advertise message to the DHCPv6 client through the DHCPv6 relay agent, so as to indicate that DHCP services are available, in which a payload of the advertise message carries an IP address of the DHCPv6 server.

Figure 2:
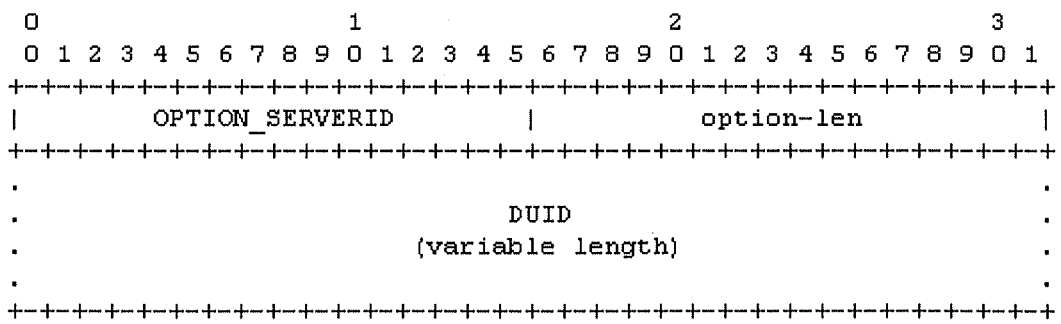
FIG. 2 is a schematic view of a format of a server identifiers option according to an embodiment of the present invention.

The advertise message includes a server identifiers option of the DHCPv6 server, in which the format of the server identifiers option is as shown in FIG. 2, and includes an OPTION_SERVERID field, an option-len field, and a DUID field, in which the DUID field is a field with variable length, and used to identify the DHCPv6 server. Existing DUID types include link-layer address plus time, vendor-assigned unique ID based on Enterprise Number, and link-layer address.

Optionally, in an embodiment of the present invention, a new DUID type may be added in the original DUID field of the server identifiers option, in which the newly added DUID type is used to represent the IP address of the DHCPv6 server or other identifier information of the DHCPv6 server.

Optionally, a period of validity of the IP address of the DHCPv6 server may be further carried in the newly defined DUID type, and definitely, the period of validity of the IP address of the DHCPv6 server may also be carried in other fields of the payload of the advertise message.

Optionally, if the solicit message carries the client identifier option of the DHCPv6 client, the advertise message further carries the client identifier option of the DHCPv6 client.

In step S13, the DHCPv6 client receives the advertise message sent by the DHCPv6 server through the DHCPv6 relay agent, so as to obtain the IP address of the DHCPv6 server.

Definitely, a person of ordinary skill in the art may know through the forgoing example that, the same effect may also be achieved by carrying the IP address of the DHCPv6 server in other fields of the payload of the advertise message.

Figures 3, 4:
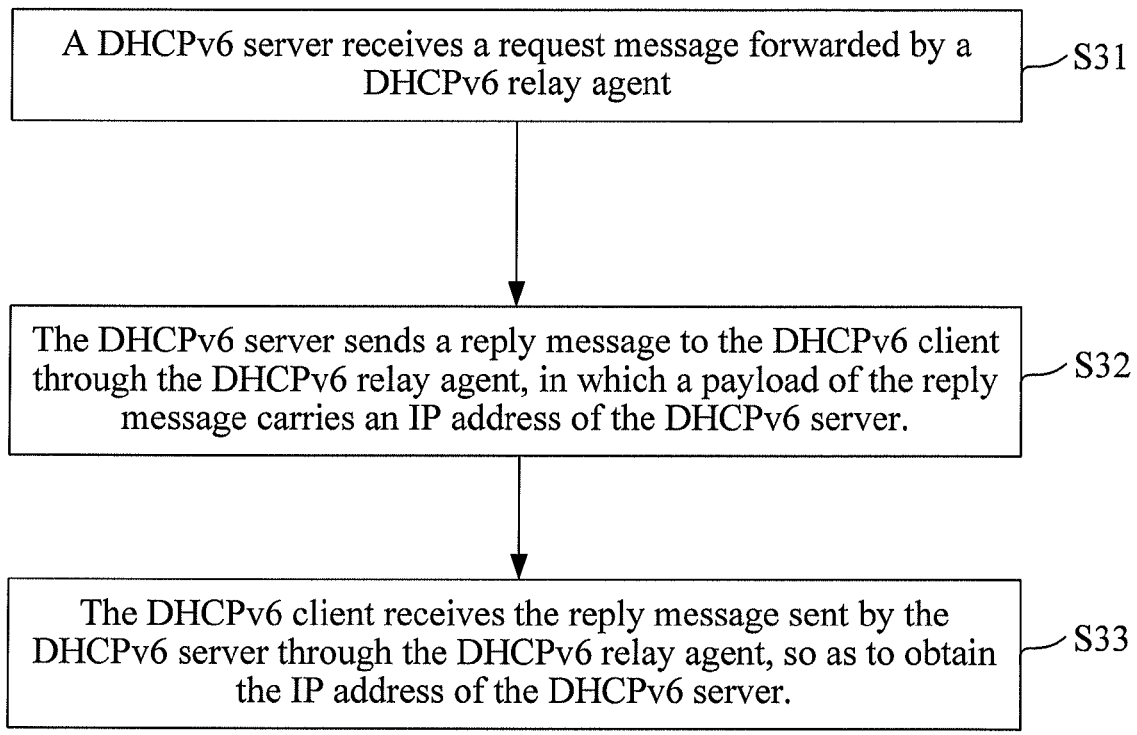
FIG. 3 is a schematic flow chart of a method for obtaining an IP address of a DHCPv6 server according to Embodiment 2 of the present invention.
FIG. 4 is a schematic view of a format of a DHCPv6 server IP option according to an embodiment of the present invention.

As shown in FIG. 3, a method for obtaining an IP address of a DHCPv6 server according to Embodiment 2 of the present invention includes:

Step S31: A DHCPv6 server receives a request message of a DHCPv6 client forwarded by a DHCPv6 relay agent, in which the request message is sent by a certain DHCPv6 client, so as to request a configuration parameter from the DHCPv6 server, and the configuration parameter may be an IP address, that is, the DHCPv6 client requests the DHCPv6 server to allocate an IP address to the DHCPv6 client; and definitely, the configuration parameter may be other configuration parameters other than IP address.

Step S32: The DHCPv6 server sends a reply message to the DHCPv6 client through the DHCPv6 relay agent, in which a payload of the reply message carries an IP address of the DHCPv6 server.

The reply message includes a server identifiers option of the DHCPv6 server, in which a format of the server identifiers option is as shown in FIG. 2, and includes an OPTION-_SERVERID field, an option-len field, and a DUID field, in which the DUID field is a field with variable length, and used to identify the DHCPv6 server. Existing DUID types include link-layer address plus time, vendor-assigned unique ID based on Enterprise Number, and link-layer address.

Optionally, in an embodiment of the present invention, a new DUID type may be added in the original DUID field of the server identifiers option, in which the newly added DUID type is used to represent the IP address of the DHCPv6 server or other identifier information of the DHCPv6 server.

Optionally, a period of validity of the IP address of the DHCPv6 server may be further carried in the newly defined DUID type, and definitely, the period of validity of the IP address of the DHCPv6 server may also be carried in other fields of the payload of the advertise message.

Step S33: The DHCPv6 client receives the reply message sent by the DHCPv6 server through the DHCPv6 relay agent, so as to obtain the IP address of the DHCPv6 server.

Definitely, a person of ordinary skill in the art may know through the forgoing example that, the same effect may also be achieved by carrying the IP address of the DHCPv6 server in other fields of the payload of the reply message.

The DHCPv6 client, which obtains the IP address and/or other configuration parameters in the manner in the embodiment, may send a renew message to the DHCPv6 server through the DHCPv6 relay agent, so as to request the DHCPv6 server to prolong a life-span of the IP address of the DHCPv6 client and/or renew other configuration parameters, in which the renew message carries the server identifiers option of the DHCPv6 server previously received by the DHCPv6 client, and the server identifiers option includes the DUID field carrying the IP address of the DHCPv6 server. If the DHCPv6 client does not receive an answer to the renew message from the DHCPv6 server, the DHCPv6 client may further send a rebind message to the DHCPv6 server, so as to prolong the life-span of the IP address of the DHCPv6 client and/or renew other configuration parameters. The rebind message carries the server identifiers option of the DHCPv6 server previously received by the DHCPv6 client, and the server identifiers option includes the DUID field carrying the IP address of the DHCPv6 server.

The DHCPv6 server may send a reply message including the IP address and the configuration parameters, so as to answer the received request, renew, and rebind messages sent by the DHCPv6 client; the DHCPv6 server may also send a reply message including the configuration parameters, so as to answer an information-request message; and the DHCPv6 server may send a reply message to answer a confirm message and confirm the address allocated to the client, deny the address allocated to the client, admit the receiving of a release message, or admit the receiving of a decline message. The reply message carries the server identifiers option of the DHCPv6 server, and the server identifiers option includes the DUID field carrying the IP address of the DHCPv6 server.

In addition, when the DHCPv6 client sends a release message to the DHCPv6 server, so as to indicate that the DHCPv6 client does not use the IP address allocated by the DHCPv6 server, the release message further carries the server identifiers option of the DHCPv6 server previously received by the DHCPv6 client, and the server identifiers option includes the DUID field carrying the IP address of the DHCPv6 server.

When the DHCPv6 client sends a decline message to the DHCPv6 server, so as to indicate that the IP address allocated by the DHCPv6 server has been used by other nodes in a link, the decline message further carries the server identifiers option of the DHCPv6 server previously received by the DHCPv6 client, and the server identifiers option includes the DUID field carrying the IP address of the DHCPv6 server.

When the DHCPv6 server sends a reconfigure message, so as to notify the DHCPv6 client that the DHCPv6 server has a new or a latest configuration parameter, and allow the DHCPv6 client to initiate a renew/reply or an information-request/reply processing, so as to receive the new or the latest configuration parameter of the DHCPv6 server. The reconfigure message also carries the server identifiers option of the DHCPv6 server previously received by the DHCPv6 client, and the server identifiers option includes the DUID field carrying the IP address of the DHCPv6 server.

If the DHCPv6 client has obtained an address allocated by a certain DHCPv6 server to the DHCPv6 client, when the DHCPv6 client sends an information-request message to the DHCPv6 server, so as to request a configuration parameter other than the IP address, the information-request message further carries the server identifiers option of the DHCPv6 server previously received by the DHCPv6 client, and the server identifiers option includes the DUID field carrying the IP address of the DHCPv6 server.

In Embodiments 1 and 2, the DHCPv6 server carries its own IP address in the DUID field of the server identifiers option, and the server identifiers option is not stripped by the DHCPv6 relay agent in a process of being forwarded by the DHCPv6 relay agent to the DHCPv6 client, so that the DHCPv6 client can obtain the IP address of the DHCPv6 server. When the DHCPv6 server uses the CGA address, the message sent between the DHCPv6 server and the DHCPv6 client can be effectively protected.

In a method for obtaining an IP address of a DHCPv6 server according to Embodiment 3 of the present invention, similar to the foregoing embodiments, a DHCPv6 server carries its own IP address in a payload of a relay-reply message sent by the DHCPv6 server to a DHCPv6 relay agent. The relay-reply message is sent to the DHCPv6 relay agent, and then forwarded to a DHCPv6 client by the DHCPv6 relay agent, and the DHCPv6 client processes the received relay-reply message, thereby obtaining the IP address of the DHCPv6 server.

For example, when the DHCPv6 server sends a reply message with an allocated IP address to the DHCPv6 client through the DHCPv6 relay agent, a relay-reply message is sent to the DHCPv6 relay agent, in which the DHCPv6 server relay-reply message includes a newly defined DHCPv6 server IP option, and a format of the newly defined DHCPv6 server IP option is as shown in FIG. 4. The newly defined DHCPv6 server IP option includes a server IP address field, an OPTION_SERVERIP field, and an option-len field, in which the server IP address field is used to carry the IP address of the DHCPv6 server, the OPTION_SERVERIP field may be used to carry other relevant information of the IP address of the DHCPv6 server, for example, a period of validity of the IP address of the DHCPv6 server, and definitely, the period of validity of the IP address of the DHCPv6 server may also be carried in other fields of the payload of the relay-reply message.

Definitely, a person of ordinary skill in the art may know through the embodiment that, the same effect may also be achieved by carrying the IP address of the DHCPv6 server in other fields of the payload of the relay-reply message.

After receiving the relay-reply message sent by the DHCPv6 server, the DHCPv6 relay agent processes the relay-reply message, strips a message header of the relay-reply message, and forwards the relay-reply message to the DHCPv6 client according to the address of the DHCPv6 client carried in the relay-reply message.

As the DHCPv6 relay agent strips only the message header of the relay-reply message in parsing the relay-reply message and the IP address of the DHCPv6 server is carried in the payload of the relay-reply message, the IP address of the DHCPv6 server is retained and finally sent to the DHCPv6 client. Therefore, the DHCPv6 client can obtain the IP address of the DHCPv6 server, and the message sent between the DHCPv6 server and the DHCPv6 client can be effectively protected when the DHCPv6 server uses a CGA address.

Figure 5:
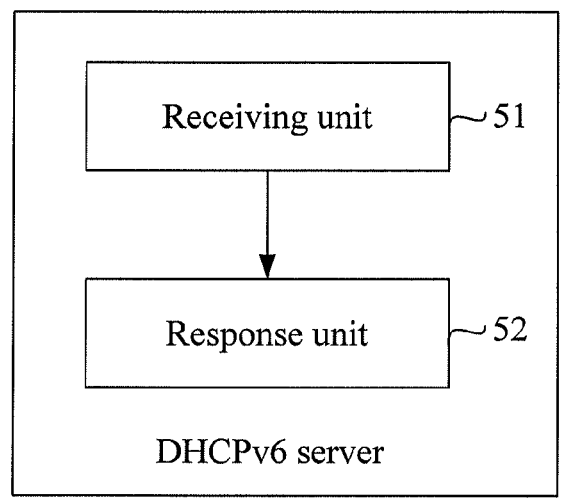
FIG. 5 is a schematic structural view of a DHCPv6 server according to an embodiment of the present invention.

An embodiment of the present invention further provides a DHCPv6 server, which is applied in a scenario of communication through a DHCPv6 relay agent, and includes a receiving unit 51 and a response unit 52, as shown in FIG. 5.

The receiving unit 51 is configured to receive a message of a DHCPv6 client forwarded by a DHCPv6 relay agent.

The response unit 52 is configured to send a response message to the DHCPv6 client through the DHCPv6 relay agent, in which a payload of the response message carries an IP address of the DHCPv6 server, so that the DHCPv6 client obtains the IP address of the DHCPv6 server from the response message.

Optionally, when the response message is an advertise message or a reply message, the IP address of the DHCPv6 server is carried in a payload of the advertise message or the reply message. For example, a new DUID type is added in a DUID field of a server identifiers option of the advertise message or the reply message, and the newly added DUID type is used to represent the IP address of the DHCPv6 server or other identifier information of the DHCPv6 server. Definitely, a period of validity of the IP address of the DHCPv6 server may also be carried in the newly added DUID type, and definitely, the period of validity of the IP address of the DHCPv6 server may also be carried in other fields of the payload of the advertise message or the reply message.

Definitely, a person of ordinary skill in the art may know through the forgoing specific example that, the same effect may also be achieved by carrying the IP address of the DHCPv6 server in other fields of the payload of the advertise message or the reply message.

Optionally, when the response message is a relay-reply message, the IP address of the DHCPv6 server is carried in a payload of the relay-reply message sent by the response unit to the DHCPv6 relay agent. The relay-reply message is sent to the DHCPv6 relay agent, and then forwarded to the DHCPv6 client by the DHCPv6 relay agent, and the DHCPv6 client processes the received relay-reply message, thereby obtaining the IP address of the DHCPv6 server. Definitely, a person of ordinary skill in the art may know through the forgoing specific example that, the same effect may also be achieved by carrying the IP address of the DHCPv6 server in other fields of the payload of the relay-reply message. An OPTION_SERVERIP field of the relay-reply message may be used to carry other relevant information of the IP address of the DHCPv6 server, for example, the period of validity of the IP address of the DHCPv6 server, and definitely, the period of validity of the IP address of the DHCPv6 server may also be carried in other fields of the payload of the relay-reply message.

In the forgoing embodiment of the present invention, as the DHCPv6 relay agent strips only a message header of the response message in parsing the response message sent by the DHCPv6 server and the IP address of the DHCPv6 server is carried in the payload of the response message, the IP address of the DHCPv6 server is retained and finally sent to the DHCPv6 client, after being processed by the DHCPv6 relay agent. Therefore, the DHCPv6 client can obtain the IP address of the DHCPv6 server, and the message sent between the DHCPv6 server and the DHCPv6 client can be effectively protected when the DHCPv6 server uses a CGA address.

In the forgoing embodiment of the present invention, the IP address of the DHCPv6 server may be an IPv6 address of the DHCPv6 server, and particularly, the IP address of the DHCPv6 server may be the CGA address of the DHCPv6 server.

Figure 6:
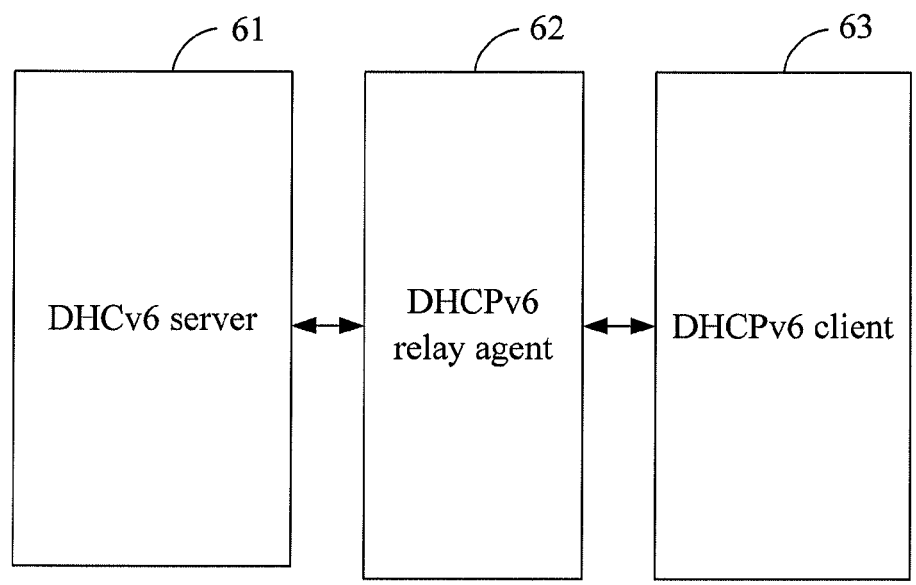
FIGS. 6 and 7 are schematic structural views of a DHCPv6 communication system according to an embodiment of the present invention.

An embodiment of the present invention further provides a DHCPv6 communication system, which includes a DHCv6 server 61, a DHCPv6 relay agent 62, and a DHCPv6 client 63, as shown in FIG. 6.

The DHCPv6 server 61 is configured to receive a request message of the DHCPv6 client 63 forwarded by the DHCPv6 relay agent 62, and send a response message to the DHCPv6 client 63 through the DHCPv6 relay agent 62, in which a payload of the response message carries an IP address of the DHCPv6 server.

The DHCPv6 relay agent 62 is located between the DHCv6 server 61 and the DHCPv6 client 63, so that the DHCv6 server 61 can communicate with the DHCPv6 client 63 through the DHCPv6 relay agent 62.

The DHCP client 63 is configured to send the request message to the DHCPv6 server 61 through the DHCPv6 relay agent 62.

Optionally, the DHCP client 63 is further configured to receive the response message sent by the DHCPv6 server 61 through the DHCPv6 relay agent 62, and obtain the IP address of the DHCPv6 server 61 from the response message.

Figure 7:
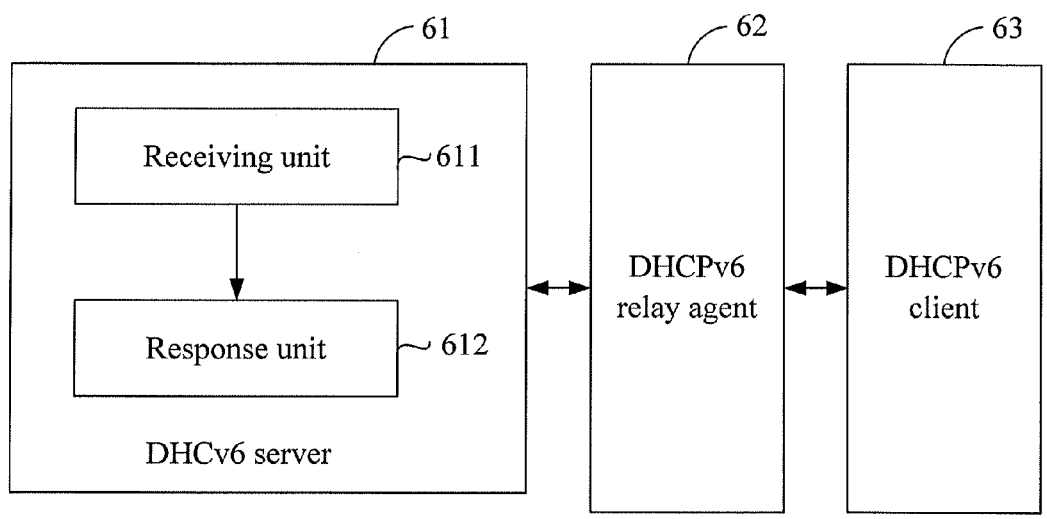

Optionally, as shown in FIG. 7, the DHCPv6 server 61 may include a receiving unit 611 and a response unit 612.

The receiving unit 611 is configured to receive the request message of the DHCPv6 client 63 forwarded by the DHCPv6 relay agent 62.

The response unit 612 is configured to send the response message to the DHCPv6 client 63 through the DHCPv6 relay agent 62, in which the payload of the response message carries the IP address of the DHCPv6 server 61, so that the DHCPv6 client 63 obtains the IP address of the DHCPv6 server 61 from the response message.

Optionally, when the response message is an advertise message or a reply message, the IP address of the DHCPv6 server is carried in a payload of the advertise message or the reply message. For example, a new DUID type is added in a DUID field of a server identifiers option of the advertise message or the reply message, and the newly added DUID type is used to represent the IP address of the DHCPv6 server or other identifier information of the DHCPv6 server. For example, a period of validity of the IP address of the DHCPv6 server may also be carried in the newly added DUID type, and definitely, the period of validity of the IP address of the DHCPv6 server may also be carried in other fields of the payload of the advertise message or the reply message.

Definitely, a person of ordinary skill in the art may know through the embodiment that, the same effect may also be achieved by carrying the IP address of the DHCPv6 server in other fields of the payload of the advertise message or the reply message.

Optionally, when the response message is a relay-reply message, the IP address of the DHCPv6 server is carried in a payload of the relay-reply message sent by the response unit to the DHCPv6 relay agent. The relay-reply message is sent to the DHCPv6 relay agent, and then forwarded to the DHCPv6 client by the DHCPv6 relay agent, and the DHCPv6 client processes the received relay-reply message, thereby obtaining the IP address of the DHCPv6 server. Definitely, a person of ordinary skill in the art may know through the embodiment that, the same effect may also be achieved by carrying the IP address of the DHCPv6 server in other fields of the payload of the relay-reply message. An OPTION_SERVERIP field of the relay-reply message may be used to carry other relevant information of the IP address of the DHCPv6 server, for example, the period of validity of the IP address of the DHCPv6 server, and definitely, the period of validity of the IP address of the DHCPv6 server may also be carried in other fields of the payload of the relay-reply message.

In the forgoing embodiment of the present invention, as the DHCPv6 relay agent strips only a message header of the response message in parsing the response message sent by the DHCPv6 server and the IP address of the DHCPv6 server is carried in the payload of the response message, the IP address of the DHCPv6 server is retained and finally sent to the DHCPv6 client, after being processed by the DHCPv6 relay agent. Therefore, the DHCPv6 client can obtain the IP address of the DHCPv6 server, and the message sent between the DHCPv6 server and the DHCPv6 client can be effectively protected when the DHCPv6 server uses a CGA address.

In the forgoing embodiment of the present invention, the IP address of the DHCPv6 server may be an IPv6 address of the DHCPv6 server, and particularly, the IP address of the DHCPv6 server may be the CGA address of the DHCPv6 server. In addition, one or more DHCPv6 relay agents may exist.

Through the forgoing description of the implementation, it is clear to a person skilled in the art that the present invention may be accomplished through software plus a necessary universal hardware platform, or through hardware, with the former being preferred in most cases. Based on this understanding, the forgoing technical solution or the part that makes contributions to the prior art can be substantially embodied in the form of a software product. The computer software product may be stored in a storage medium, and contain several instructions to instruct computer equipment (for example, a personal computer, a server, or network equipment) to perform the method described in the embodiments of the present invention.

Some exemplary embodiments of the present invention are described, but are not intended to limit the protection scope of the present invention. Various variations and modifications easily made by a person skilled in the art without departing from the spirit of the present invention fall within the scope of the present invention as defined by the appended claims. Therefore, the protection scope of the present invention is subject to the protection scope defined in the claims.

What is claimed is:

1. A method for obtaining an Internet Protocol (IP) address identifying a Dynamic Host Configuration Protocol version 6 (DHCPv6) server, wherein the DHCPv6 server and a DHCPv6 client are in different links and transmit DHCPv6 messages through a DHCPv6 relay agent, and the method comprises:
   receiving, by the DHCPv6 server, a DHCPv6 message sent by the DHCPv6 client and forwarded by the DHCPv6 relay agent, where the DHCPv6 server, the DHCPv6 client and the DHCPv6 relay agent are configured to run the DHCPv6; and
   sending, by the DHCPv6 server, a DHCPv6 response message to the DHCPv6 client through the DHCPv6 relay agent, wherein the DHCPv6 response message is used to respond to the DHCPv6 message sent by the DHCPv6 client, and an IP address identifying the DHCPv6 server is carried in a DHCP unique identifier (DUID) field of a server identifiers option of a payload of the DHCPv6 response message to avoid the IP address identifying the DHCPv6 server being stripped by the DHCPv6 relay agent when the DHCPv6 relay agent forwards the DHCPv6 response message to the DHCPv6 client.

2. The method according to claim 1, wherein the DHCPv6 response message comprises one of an advertise message, a reply message, a relay-reply message and a reconfigure message.

3. The method according to claim 1, wherein the DUID field comprises a new DUID type, the new DUID type carrying the IP address identifying the DHCPv6 server.

4. The method according to claim 1, wherein the payload of the DHCPv6 response message carries a period of validity of the IP address identifying the DHCPv6 server.

5. The method according to claim 2, wherein the payload of the DHCPv6 response message carries a period of validity of the IP address identifying the DHCPv6 server.

6. The method according to claim 3, wherein the payload of the DHCPv6 response message carries a period of validity of the IP address identifying the DHCPv6 server.

7. The method according to claim 1, wherein the IP address identifying the DHCPv6 server is a Cryptographically Generated Address (CGA) identifying the DHCPv6 server.

8. A Dynamic Host Configuration Protocol version 6 (DHCPv6) server, wherein the DHCPv6 server and a DHCPv6 client are in different links and transmit DHCPv6 messages through a DHCPv6 relay agent, and the DHCPv6 server comprises:
   a receiving unit, configured to receive a DHCPv6 message sent by the DHCPv6 client forwarded by a DHCPv6 relay agent, where the DHCPv6 server, the DHCPv6 client and the DHCPv6 relay agent are configured to run the DHCPv6; and
   a response unit, configured to send a DHCPv6 response message to the DHCPv6 client through the DHCPv6 relay agent, wherein the DHCPv6 response message is used to respond to the DHCPv6 message sent by the DHCPv6 client, and an Internet Protocol (IP) address identifying the DHCPv6 server is carried in a DHCP unique identifier (DUID) field of a server identifiers option of a payload of the DHCPv6 response message to avoid the IP address identifying the DHCPv6 server being stripped by the DHCPv6 relay agent when the DHCPv6 response message is forwarded to by the DHCPv6 relay agent to the DHCPv6 client.

9. The DHCPv6 server according to claim 8, wherein the payload of the DHCPv6 response message carries a period of validity of the IP address identifying the DHCPv6 server.

10. The DHCPv6 server according to claim 8, wherein the IP address identifying the DHCPv6 server is a Cryptographically Generated Address (CGA) identifying the DHCPv6 server.

11. A Dynamic Host Configuration Protocol version 6 (DHCPv6) communication system, comprising a DHCv6 server, a DHCPv6 relay agent, and a DHCPv6 client, wherein the DHCPv6 server and a DHCPv6 client are in different links and transmit a DHCPv6 message through a DHCPv6 relay agent, and the DHCPv6 server, the DHCPv6 client and the DHCPv6 relay agent are configured to run the DHCPv6,
   the DHCPv6 server is configured to receive a DHCPv6 message sent by the DHCPv6 client and relayed by the DHCPv6 relay agent, and send a DHCPv6 response message to the DHCPv6 client through the DHCPv6 relay agent, wherein the DHCPv6 response message is used to respond to the DHCPv6 message sent by the DHCPv6 client and an Internet Protocol (IP) address identifying the DHCPv6 server is carried in a DHCP unique identifier (DUID) field of a server identifiers option of a payload of the response message to avoid the IP address identifying the DHCPv6 server is stripped by the DHCPv6 relay agent when the DHCPv6 response message is forwarded to by the DHCPv6 relay agent to the DHCPv6 client.

12. The DHCPv6 communication system according to claim 11, wherein the payload of the DHCPv6 response message carries a period of validity identifying the IP address of the DHCPv6 server.

13. The DHCPv6 communication system according to claim 11, wherein the IP address identifying the DHCPv6 server is a Cryptographically Generated Address (CGA) identifying the DHCPv6 server.

14. The DHCPv6 communication system according to claim 12, wherein the IP address identifying the DHCPv6 server is a Cryptographically Generated Address (CGA) identifying the DHCPv6 server.

15. The DHCPv6 communication system according to claim 11, wherein the DHCPv6 client is further configured to receive the response message sent by the DHCPv6 server through the DHCPv6 relay agent, and obtain the IP address identifying the DHCPv6 server from the response message.

* * * * *